US009697241B1

(12) United States Patent
Mistry et al.

(10) Patent No.: US 9,697,241 B1
(45) Date of Patent: Jul. 4, 2017

(54) DATA FABRIC LAYER HAVING NODES ASSOCIATED WITH VIRTUAL STORAGE VOLUMES OF UNDERLYING STORAGE INFRASTRUCTURE LAYER

(71) Applicant: EMC Corporation, Hopkinton, MA (US)

(72) Inventors: Nalinkumar Mistry, Ottawa (CA); Mats Wahlstrom, Lakewood Ranch, FL (US); Jiale Huo, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 14/662,887

(22) Filed: Mar. 19, 2015

(51) Int. Cl.
*G06F 11/00* (2006.01)
*G06F 17/30* (2006.01)
*G06F 11/20* (2006.01)

(52) U.S. Cl.
CPC .... *G06F 17/30312* (2013.01); *G06F 11/2023* (2013.01); *G06F 17/30575* (2013.01); *G06F 2201/80* (2013.01)

(58) Field of Classification Search
CPC ..... G06F 11/142; G06F 11/14; G06F 11/2023
See application file for complete search history.

(56) References Cited

U.S. PATENT DOCUMENTS 7,290,168 B1* 10/2007 DeKoning .......... H04L 67/1097
714/5.11
8,370,837 B2* 2/2013 Emelianov .......... G06F 9/45558
714/13
2012/0109958 A1* 5/2012 Thakur ............. G06F 17/30289
707/737
2013/0218840 A1 8/2013 Smith et al.
2013/0247034 A1* 9/2013 Messerli ............. G06F 9/45533
718/1
2014/0013069 A1 1/2014 Mitsuno et al.
(Continued)

OTHER PUBLICATIONS

B.P. Rimal et al., "A Taxonomy and Survey of Cloud Computing Systems," Fifth International Joint Conference on INC, IMS and IDC, Aug. 2009, pp. 44-51, Seoul, South Korea.
(Continued)

*Primary Examiner* — Bryce Bonzo
*Assistant Examiner* — Jonathan Gibson
(74) *Attorney, Agent, or Firm* — Ryan, Mason & Lewis, LLP

(57) ABSTRACT

A processing platform implemented using one or more processing devices comprises a data fabric layer and a storage infrastructure layer underlying the data fabric layer. The data fabric layer comprises at least one database application having a plurality of nodes. The storage infrastructure layer comprises a plurality of storage servers and is configured to implement one or more virtual storage volumes for each of the nodes of the database application of the data fabric layer using the storage servers. In some embodiments, responsive to detection of a failure of a given one of the nodes of the database application, the one or more virtual storage volumes associated with the given node are utilized to facilitate instantiation of a replacement node for the given node. For example, a virtual storage volume may be unmounted from the given node and attached to the replacement node.

21 Claims, 6 Drawing Sheets

(56) References Cited

U.S. PATENT DOCUMENTS

2014/0298091 A1* 10/2014 Carlen .................. H04L 65/80
714/15
2015/0026517 A1 1/2015 Ben Romdhane et al.

OTHER PUBLICATIONS

Y. Shi et al., "Benchmarking Cloud-Based Data Management Systems," Proceedings of the Second International Workshop on Cloud Data Management (CloudDB), Oct. 2010, pp. 47-54, Toronto, Ontario, Canada.

Manoj V, "Comparative Study of NoSQL Document, Column Store Databases and Evaluation of Cassandra," International Journal of Database Management Systems (IJDMS), Aug. 2014, pp. 11-26, vol. 6, No. 4, India.

Marko Vukolić, "The Byzantine Empire in the Intercloud," ACM SIGACT News, Sep. 2010, pp. 105-111, vol. 41, No. 3.

Dietrich Featherston, "Cassandra: Principles and Application," University of Illinois at Urbana-Champaign, Aug. 2010, pp. 1-17.

S. Mohammad et al., "Cloud Data Management: A Short Overview and Comparison of Current Approaches," 24th GI-Workshop on Foundations of Databases, May-Jun. 2012, pp. 41-46, Lübbenau, Germany.

"EMC ScaleIO," https://store.emc.com/us/Product-Family/EMC-ScaleIO-Products/EMC-ScaleIO/p/EMC-ScaleIO-Elastic-Storage, 2015, pp. 1-2.

"EMC ScaleIO—for Virtual Server Infrastructure," Solution Overview, Jan. 2014, 4 pages.

* cited by examiner

US 9,697,241 B1

DATA FABRIC LAYER HAVING NODES ASSOCIATED WITH VIRTUAL STORAGE VOLUMES OF UNDERLYING STORAGE INFRASTRUCTURE LAYER

FIELD

The field relates generally to information processing systems, and more particularly to techniques for implementing storage functionality in an information processing system.

BACKGROUND

Information processing systems increasingly utilize reconfigurable virtual resources, as opposed to dedicated physical resources, to meet changing needs for computation and storage solutions in an efficient, flexible and cost-effective manner. For example, cloud computing and storage systems implemented using virtual resources have been widely adopted. Notwithstanding these and other recent advances relating to utilization of virtual resources, a need remains for further improvements, for example, with regard to providing fault tolerance in information processing systems.

SUMMARY

Illustrative embodiments of the present invention provide information processing systems in which a data fabric layer includes database application nodes that are associated with virtual storage volumes of an underlying storage infrastructure layer. Such an arrangement considerably facilitates recovery from node failures in the data fabric layer, thereby providing enhanced fault tolerance in the corresponding system.

In one embodiment, a processing platform implemented using one or more processing devices comprises a data fabric layer and a storage infrastructure layer underlying the data fabric layer. The data fabric layer comprises at least one database application having a plurality of nodes. The storage infrastructure layer comprises a plurality of storage servers and is configured to implement one or more virtual storage volumes for each of the nodes of the database application of the data fabric layer using the storage servers. For example, the storage infrastructure layer may implement a plurality of single virtual storage volumes for respective ones of the nodes of the database application.

Responsive to detection of a failure of a given one of the nodes of the database application, the one or more virtual storage volumes associated with the given node may be utilized to facilitate instantiation of a replacement node for the given node. For example, responsive to detection of a failure of a given one of the nodes of the database application, the one or more virtual storage volumes associated with the given node may be unmounted from the given node and attached to a replacement node.

These and other illustrative embodiments described herein include, without limitation, methods, apparatus, systems and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to the particular illustrative system and device configurations shown. The term "information processing system" as used herein is therefore intended to be broadly construed, so as to encompass, for example, processing systems comprising private and public cloud computing or storage systems, as well as other types of processing systems comprising physical or virtual processing resources in any combination.

Figure 1:
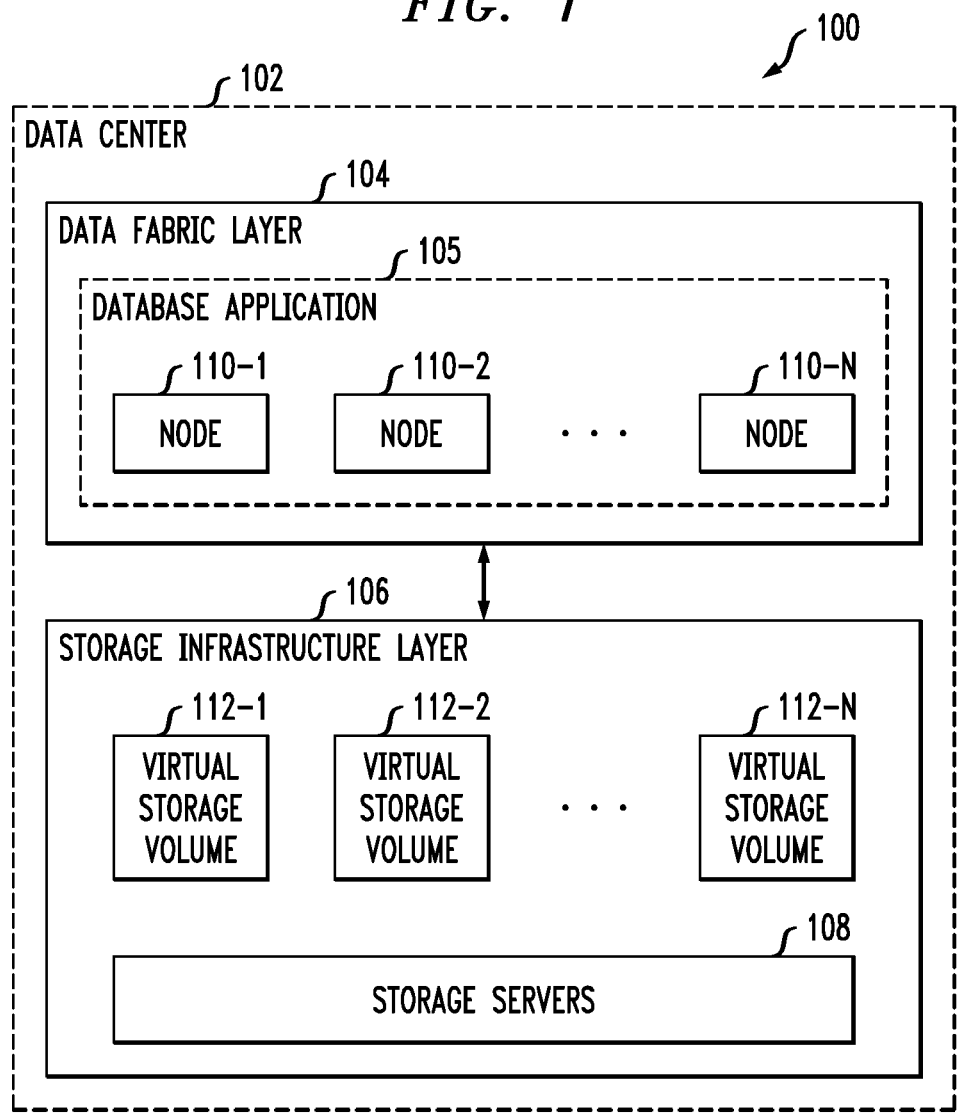
FIG. 1 is a block diagram of an information processing system comprising a data fabric layer and underlying storage infrastructure layer in an illustrative embodiment.

FIG. 1 shows an information processing system 100 comprising a data center 102. The data center 102 includes a data fabric layer 104 comprising a database application 105. The data center 102 further comprises a storage infrastructure layer 106 underlying the data fabric layer 104 and comprising a plurality of storage servers 108. The database application 105 comprises a plurality of nodes 110-1, 110-2, . . . 110-N. The nodes 110 can be arranged in a specified logical topology within the data center 102, such as a logical ring topology, although numerous other node topologies can be used. The storage infrastructure layer 106 implements single virtual storage volumes 112-1, 112-2, . . . 112-N for respective ones of the database application nodes 110-1, 110-2, . . . 110-N.

Accordingly, in this embodiment there is a one-to-one correspondence between the database application nodes 110 and the virtual storage volumes 112. In other embodiments, multiple virtual storage volumes may be associated with each of the database application nodes. It is also possible that a single virtual storage volume can be shared by multiple ones of the database application nodes.

The virtual storage volumes 112 are implemented using the storage servers 108 of the storage infrastructure layer 106. For example, in some embodiments the storage infrastructure layer 106 is configured to combine storage resources of the storage servers 108 into a pool of block storage shared by the nodes 110 of the database application 105. In an arrangement of this type, the virtual storage volumes 112 are illustratively allocated respective portions of the pool of block storage. The storage infrastructure layer 106 in such an embodiment may comprise ScaleIO™ software-defined storage functionality commercially available from EMC Corporation of Hopkinton, Mass.

Fault tolerance capability is implemented in the database application 105 of the data fabric layer 104 by replicating at least a portion of the data stored for a given one of the nodes 110 of the database application 105 on another one of the nodes of the database application. For example, the nodes 110 of the database application 105 can be configured as respective Apache Cassandra nodes, although it is to be appreciated that other database technologies can be used in a given embodiment.

Such fault tolerance capability in the present embodiment is considerably enhanced through association of the nodes 110 with respective ones of the virtual storage volumes 112. For example, responsive to detection of a failure of a given one of the nodes 110 of the database application 105, the virtual storage volume associated with the given node is utilized to facilitate instantiation of a replacement node for the given node. This illustratively involves unmounting the virtual storage volume from the given node and attaching it to the replacement node. Additional details regarding utilization of a virtual storage volume to facilitate instantiation of a replacement node will be provided elsewhere herein.

The data center 102 of the system 100 is an example of what is more generally referred to herein as a "processing platform." Such a processing platform as the term is broadly used herein generally includes at least one processing device comprising a processor coupled to a memory and may more particularly comprise a wide variety of different arrangements of multiple networked processing devices.

The storage infrastructure layer 106 of system 100 illustratively comprises one or more storage systems comprising products such as ScaleIO™, VNX® and Symmetrix VMAX®, all commercially available from EMC Corporation. Other types of storage elements can be used in implementing an information processing system or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of an information processing system as disclosed herein.

Although the system 100 in the FIG. 1 embodiment includes only a single data center 102, other embodiments can include multiple data centers or other arrangements of one or more processing platforms. Accordingly, the nodes 110 of the database application 105 can be distributed across multiple data centers. Examples of embodiments involving multiple data centers will be described in conjunction with FIGS. 3 through 6. Other distributed arrangements of the nodes 110 can also be used.

The data fabric layer 104 in the present embodiment is assumed to be implemented at least in part utilizing virtualization infrastructure of the data center 102. For example, the virtualization infrastructure may map to network functions virtualization (NFV) infrastructure and at least a subset of the nodes 110 of the database application 105 of the data fabric layer 104 may be leveraged by virtual network functions (VNFs) of the NFV infrastructure. Such VNFs can be implemented using virtual machines, containers or other virtual resources running on the NFV infrastructure. Conventional aspects of NFV infrastructure are disclosed in European Telecommunications Standards Institute (ETSI), ETSI GS NFV 001, V1.1.1, "Network Functions Virtualisation (NFV): Use Cases," October 2013, which is incorporated by reference herein. See also the Introductory and Updated White Papers entitled "Network Functions Virtualisation," presented at the SDN and OpenFlow World Congress, Oct. 22-24, 2012 and Oct. 15-17, 2013, respectively, which are incorporated by reference herein.

An NFV management entity, such as a management and orchestration entity of the NFV infrastructure, may be configured to proactively monitor at least a subset of the nodes 110 and to adjust resources allocated to those nodes in order to satisfy one or more policies. In such an arrangement, nodes can be dynamically added to, modified in and deleted from the database application 105 in accordance with one or more specified policy criteria.

The nodes 110 of the data fabric layer 104 can be configured to communicate with one another over one or more networks. These networks may include, for example, a global computer network such as the Internet, a wide area network (WAN) or a local area network (LAN), as well as portions or combinations of such networks. Additionally or alternatively, a wide variety of other types of networks can be used, including, for example, a satellite network, a telephone or cable network, a cellular network, a wireless network implemented using a wireless protocol such as WiFi or WiMAX, or various portions or combinations of these and other types of communication networks.

Networks of this type can also support communications between other portions of the system 100. These and other networks referred to herein can be implemented at least in part as an operator network or other service provider network.

As indicated above, at least portions of the information processing system 100 are implemented using one or more processing platforms. Examples of such platforms will be described in greater detail below in conjunction with FIGS. 9 and 10. Again, a given such processing platform comprises at least one processing device comprising a processor coupled to a memory, and the processing device may be implemented at least in part utilizing one or more virtual machines, containers or other virtualization infrastructure, or other combinations of physical and virtual resources.

It should be understood that the particular arrangement of components implemented in the system 100 as illustrated in FIG. 1 are presented by way of example only. In other embodiments, additional or alternative sets of layers, storage servers, nodes, virtual storage volumes or other related components may be used, and such components may exhibit alternative functionality and configurations. For example, the nodes 110 of system 100 can be dynamically reconfigured over time responsive to user demand and other factors.

The operation of the information processing system 100 will now be described in further detail with reference to the flow diagram of FIG. 2. The process as shown includes steps 200 through 206, and is described with reference to components of the system 100 but is more generally applicable to other systems comprising multiple nodes of a data fabric layer arranged as disclosed herein.

In step 200, a data fabric layer of an information processing system is configured to include at least one database application having multiple nodes. For example, with reference to the FIG. 1 embodiment, data fabric layer 104 of data center 102 in system 100 is configured to include database application 105 comprising nodes 110. The data fabric layer configured in step 200 may comprise a NoSQL data fabric layer, although other types of data fabric layers can be used in other embodiments.

In step 202, a storage infrastructure layer is provided. The storage infrastructure layer underlies the data fabric layer and comprises multiple storage servers. In the FIG. 1 embodiment, the storage infrastructure layer 106 comprising storage servers 108 underlies the data fabric layer 104.

In step 204, one or more virtual storage volumes are implemented for each of the nodes of the database application of the data fabric layer using the storage servers of the storage infrastructure layer. For example, again with reference to the FIG. 1 embodiment, each of the nodes 110 of the database application 105 illustratively has a single virtual storage volume associated therewith.

In step 206, upon failure of a given one of the nodes of the database application, the virtual storage volume associated with the given node is utilized to facilitate instantiation of a replacement node for the given node.

As mentioned previously in the context of the FIG. 1 embodiment, this may involve unmounting one of the virtual storage volumes 112 from the corresponding failed one of the nodes 110 and attaching it to a replacement node. The virtual storage volume is assumed to comprise metadata that is utilized in the configuration of the replacement node.

Numerous alternative arrangements are possible. For example, in some embodiments the nodes 110 of the database application 105 are associated with respective containers. In such an embodiment, responsive to detection of a failure of a given one of the nodes of the database application, a new container is started for the replacement node and pointed to the virtual storage volume associated with the given node. A differential or "delta" recovery sequence is then initiated for the new container using the virtual storage volume associated with the given node. Once the differential recovery sequence is completed, the replacement node is brought online to replace the given node.

Figure 3:
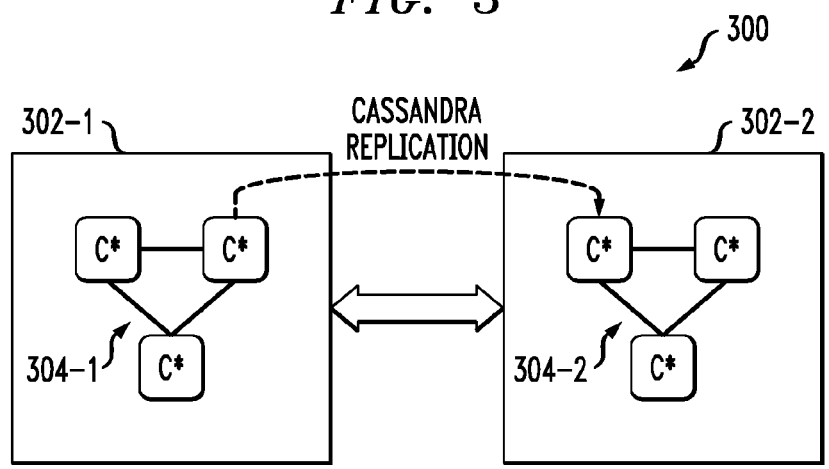
FIGS. 3-8 are block diagrams of other information processing systems in illustrative embodiments.

It was indicated above that at least a portion of the data stored for one of the nodes of the database application may be replicated on another one of the nodes of the database application. An example of such an arrangement is shown in FIG. 3. This figure illustrates an information processing system 300 comprising first and second data centers 302-1 and 302-2. The data centers 302-1 and 302-2 comprise respective data fabric layer portions 304-1 and 304-2 each comprising multiple Cassandra nodes denoted C*. More particularly, the system 300 comprises a six-node Cassandra cluster spread across the two data centers 302.

The Cassandra nodes in each of the portions 304 of the data fabric layer in this embodiment are arranged in a specified logical topology, namely, a logical ring topology. As mentioned previously, numerous other logical topologies can be used for the nodes of a data fabric layer in other embodiments.

In the FIG. 3 embodiment, the nodes arranged in the specified logical topology in the first data center 302-1 are part of a cluster of database application nodes that further includes a plurality of additional nodes that are part of an additional specified logical topology in the second data center 302-2. Other embodiments can include sets of nodes in respective specified logical topologies in more than two data centers.

The Cassandra nodes in the system 300 implement asynchronous masterless replication, such as that shown by the dashed line in the figure. The dashed line illustrates replication performed between nodes in data fabric layer portion 304-1 and nodes in data fabric layer portion 304-2. More particularly, Cassandra provides automatic data distribution across all nodes that are part of a given cluster, such that if there is a failure of any node in the cluster, replicated data from that node is available on one or more other nodes in the cluster.

Cassandra replication is generally designed to provide high availability with no single point of failure, and is more particularly configured to satisfy partition tolerance and availability properties of the well-known CPA theorem, where CPA denotes consistency, partition tolerance and availability.

However, we have determined that an arrangement such as that shown in FIG. 3 can be problematic in the presence of node failures. For example, replacing a failed Cassandra node is generally achieved through configuration of a number of attributes in a configuration file including a seed list. The seed list determines which nodes the new node should contact to learn about the cluster and establish a gossip process. Unfortunately, a significant waiting period is required, typically on the order of hours or days, before removing failed node information from the gossip process. This makes it unduly difficult for a given failed node to be replaced, and undermines the overall fault tolerance of the corresponding system.

Embodiments of the present invention expedite recovery from node failures by leveraging virtual storage volumes implemented for respective ones of the nodes using the storage servers of the storage infrastructure layer.

Figure 4:
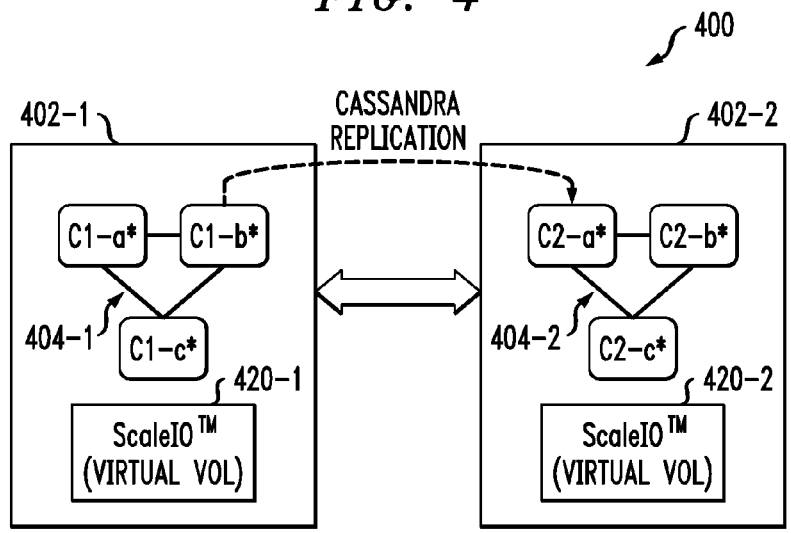

This is illustrated in one embodiment with reference to FIG. 4, which shows an information processing system 400 comprising first and second data centers 402-1 and 402-2 that include respective data fabric layer portions 404-1 and 404-2. Like the FIG. 3 embodiment, this embodiment implements a six-node Cassandra cluster across the two data centers 402, with each data center including three nodes arranged in a logical ring topology, although it is to be appreciated that the number of nodes in each data center and their respective topologies can be varied depending upon the particular needs of a given embodiment.

The nodes of the data fabric layer 404-1 in the first data center 402-1 are more particularly denoted in this embodiment as nodes C1-$a$*, C-1$b$* and C1-$c$*. Similarly, the nodes of the data fabric layer 404-2 in the second data center 402-2 are more particularly denoted as nodes C2-$a$*, C-2$b$* and C2-$c$*.

The data centers 402-1 and 402-2 further include respective storage infrastructure layers that include ScaleIO™ installations 420-1 and 420-2 that are used to implement virtual storage volumes for respective ones of the nodes in the data fabric layer portions 404-1 and 404-2. More particularly, in this embodiment it is assumed that each of the six Cassandra nodes is assigned a corresponding virtual storage volume implemented using the appropriate one of the ScaleIO™ installations 420-1 and 420-2.

An example of one technique for handling a node failure in an arrangement such as that of the FIG. 4 embodiment will now be described in more detail with reference to FIG. 5. In the FIG. 5 embodiment, an information processing system 500 comprises first and second data centers 502-1 and 502-2, data fabric layer portions 504-1 and 504-2 and ScaleIO™ installations 520-1 and 520-2, all of which are generally arranged in the same manner previously described in conjunction with the corresponding elements of FIG. 4. It can be seen in the FIG. 5 embodiment that the ScaleIO™ installations 520-1 and 520-2 are each associated with a set of M storage servers, denoted as servers 508-1,1 through 508-1,M in the first data center 502-1 and denoted as servers 508-2,1 through 508-2,M in the second data center 502-2. Although each data center 502 in this embodiment includes the same number of storage servers, this is by way of example only and in other embodiments different numbers and arrangements of storage servers can be used in each data center.

Figure 5:
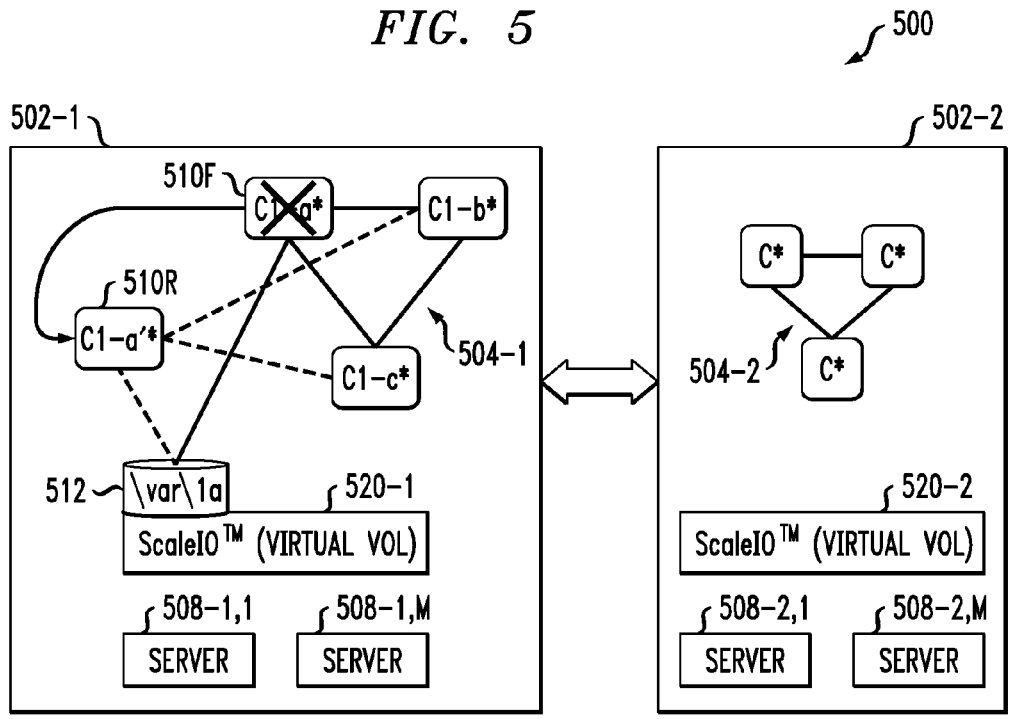

As in the FIG. 4 embodiment, it is assumed in the FIG. 5 embodiment that each of the six Cassandra nodes is assigned a corresponding virtual storage volume implemented using the corresponding one of the ScaleIO™ installations 520-1 and 520-2. By way of example, a virtual storage volume 512 is assigned to Cassandra node C-1$a$* as illustrated. This virtual storage volume is denoted \Var\1$a$. Other virtual storage volumes are similarly implemented for respective ones of the remaining five nodes of the Cassandra cluster. It is assumed for this embodiment that the virtual storage volume \Var\1a refers to a directory on a Linux system mounted from a block device created on the Linux system.

Also in the FIG. 5 embodiment, at some point after the virtual storage volume \Var\1a is implemented for Cassandra node C-1a*, that node fails as indicated by the large X in the figure. The failed node is denoted as 510F. Due to the replication within the Cassandra cluster, other cluster nodes such as the corresponding node in the data fabric layer portion 504-2 can continue to respond to requests for data associated with the failed node 510F.

Responsive to the failure of node 510F, a replacement node 510R is instantiated utilizing the associated virtual storage volume 512. For example, in a container-based implementation of the FIG. 5 embodiment, each of the Cassandra nodes is assumed to correspond to a different container. In such an implementation, detection of the failure triggers the generation of a new container denoted C-1a'* for the replacement node 510R. This new container is pointed to the virtual storage volume \Var\1a that had been assigned to the failed node 510F. A differential or "delta" recovery sequence is then initiated for the new container using the virtual storage volume \Var\1a. Once the differential recovery sequence is completed, the replacement node 510R is brought online to replace the failed node 510F. At this point the new node becomes operational and is able to service requests for data.

By leveraging the virtual storage volume 512 provided using the ScaleIO™ installation 520-1, the recovery time from the node failure in the FIG. 5 embodiment is substantially less than that which would otherwise be associated with recovery of a failed Cassandra node under conventional practice. For example, the above-noted waiting period associated with the seed list and the removal of failed node information from the gossip process, typically on the order of hours or days, is avoided. Accordingly, an arrangement such as that illustrated in the FIG. 5 embodiment considerably facilitates recovery from node failures in the data fabric layer, thereby providing enhanced fault tolerance in the corresponding system. Moreover, the virtual storage volumes serve to decouple the data fabric layer nodes from the storage servers of the underlying storage infrastructure layer. This allows the compute and storage infrastructure of the information processing system and its associated data fabric layer to scale easily without being tied to specific storage server configurations.

Figure 2:
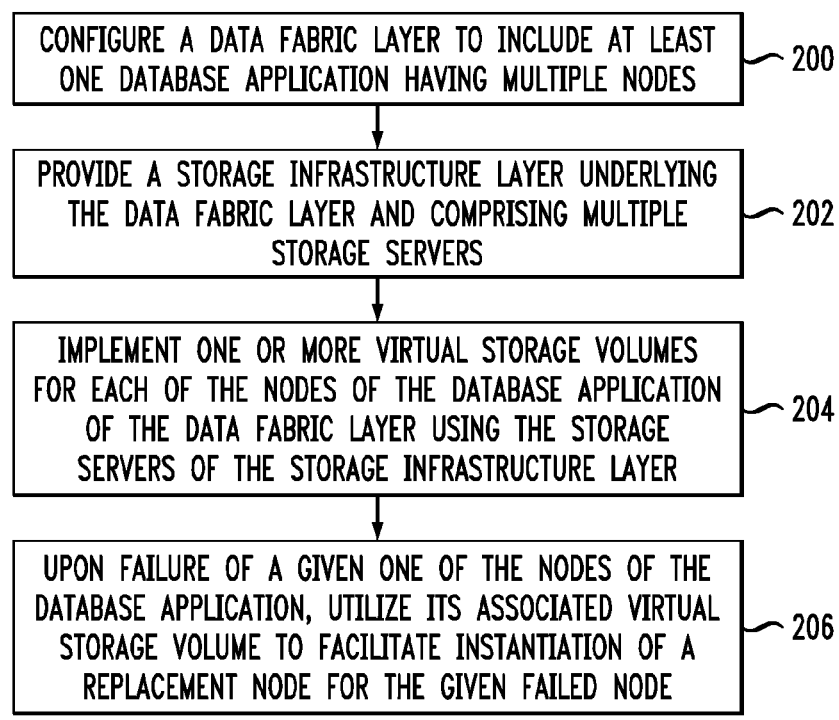
FIG. 2 is a flow diagram of an example process in an illustrative embodiment.

The particular processing operations and other system functionality described in conjunction with the flow diagram of FIG. 2 with reference to the illustrative embodiments of FIGS. 1 and 3-5 are presented by way of example only, and should not be construed as limiting the scope of the invention in any way. Alternative embodiments can use other types of processing operations involving data fabric layer nodes each associated with one or more virtual storage volumes of an underlying storage infrastructure layer. For example, the ordering of the process steps of FIG. 2 may be varied in other embodiments, or certain steps may be performed concurrently with one another rather than serially. Also, one or more of the process steps may be repeated periodically for different processing applications, or performed in parallel with one another. For example, parallel instantiations of one or more of the steps can be implemented in some embodiments.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As mentioned previously, information processing systems such as systems 100, 300, 400 and 500 described in conjunction with respective FIGS. 1 and 3-5 are presented by way of illustrative example only, and should not be construed as limiting in any way. Additional illustrative embodiments of information processing systems will now be described with reference to FIGS. 6, 7 and 8.

Figure 6:
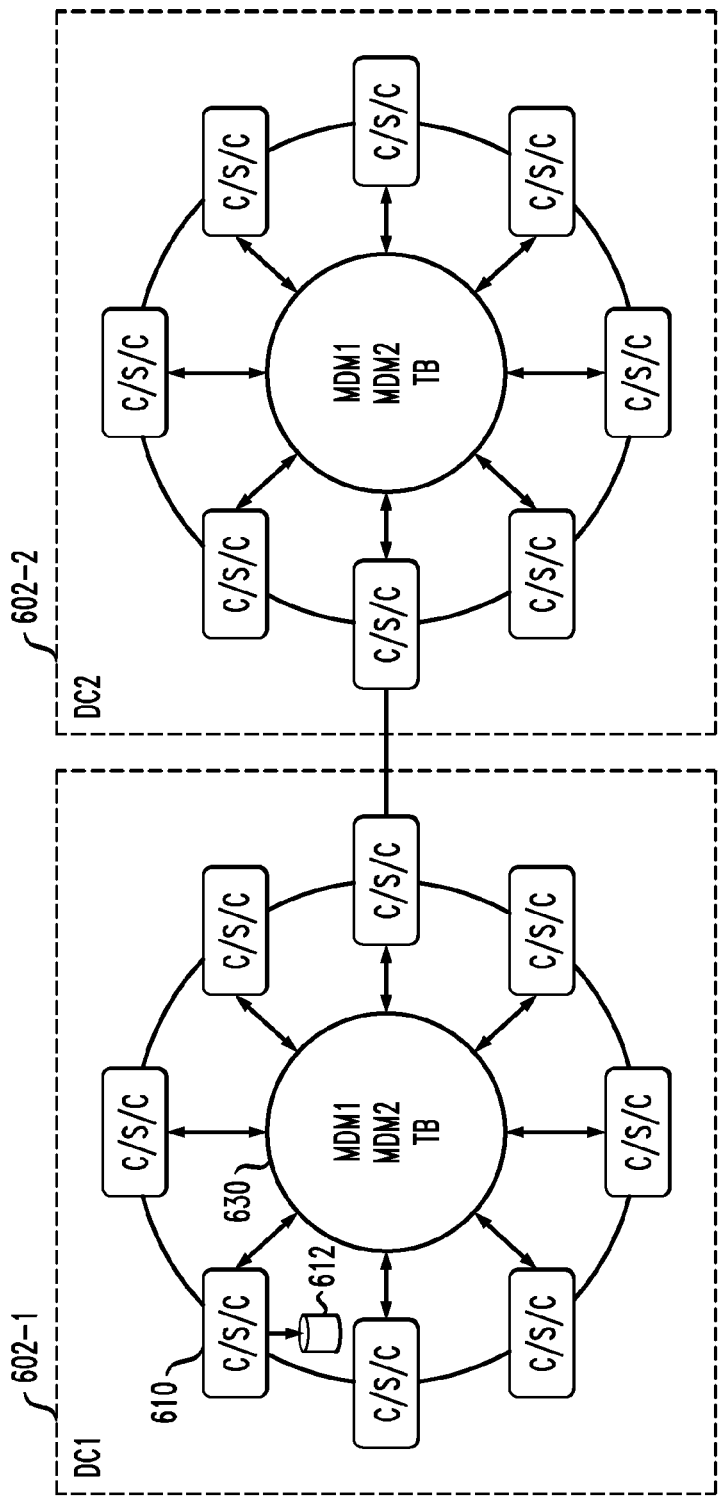

Referring initially to FIG. 6, an information processing system 600 in one embodiment comprises first and second data centers 602-1 and 602-2, also denoted as DC1 and DC2, respectively. Each of the data centers comprises a corresponding logical ring of Cassandra nodes 610, with each of the Cassandra nodes assumed to be associated with a corresponding one of a plurality of virtual storage volumes 612.

The Cassandra nodes in this embodiment are more specifically denoted in the figure as respective C/S/C nodes to indicate that these Cassandra nodes illustratively comprise Cassandra database nodes (C) implemented using ScaleIO™ storage nodes (S) running on a CoreOS operating system (C).

The logical ring of nodes 610 within each data center 602 is also associated with a corresponding management node 630. Each such management node illustratively includes two distinct master data managers (MDMs) denoted MDM1 and MDM2, and a corresponding tie-breaker (TB) element to address any conflicts between the two MDMs. The MDMs of the management node 630 control functions such as creation, mapping and unmapping of virtual storage volumes 612. For example, in conjunction with a failure of one of the Cassandra nodes, its corresponding virtual storage volume is mapped to a replacement node in a manner similar to that previously described herein.

Figure 7:
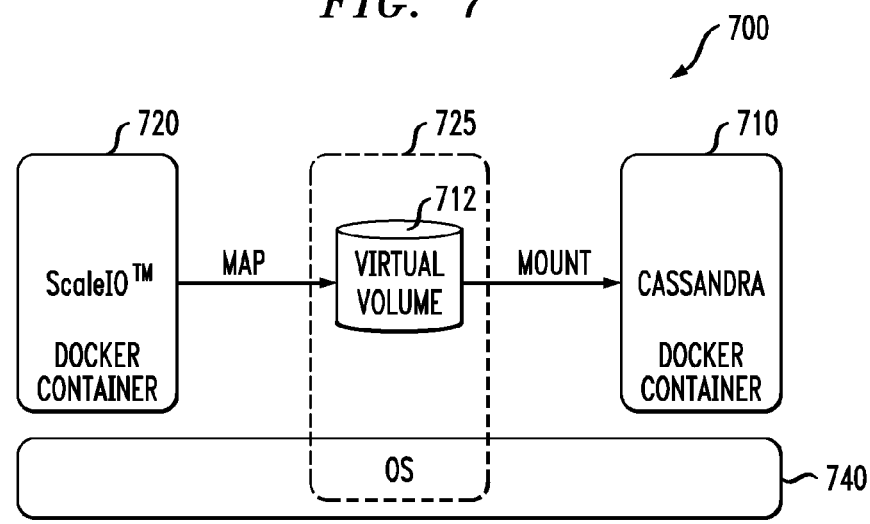

FIG. 7 shows an information processing system 700 in another embodiment of the invention. The system 700 comprises a Cassandra node 710 and a ScaleIO™ storage node 720 implemented in respective Docker containers. The Cassandra node 710 is associated with a virtual storage volume 712 created by the ScaleIO™ storage node 720. The virtual storage volume 712 effectively maps to a block storage device 725 on a host operating system (OS) 740 that also supports the Docker containers for the Cassandra and storage nodes 710 and 720. The Cassandra node 710 is configured to mount the virtual storage volume 712 as data storage as indicated in the figure. Although Docker containers are utilized in this embodiment, other embodiments can utilize other types of containers, or more generally other types and arrangements of virtualization infrastructure.

Figure 8:
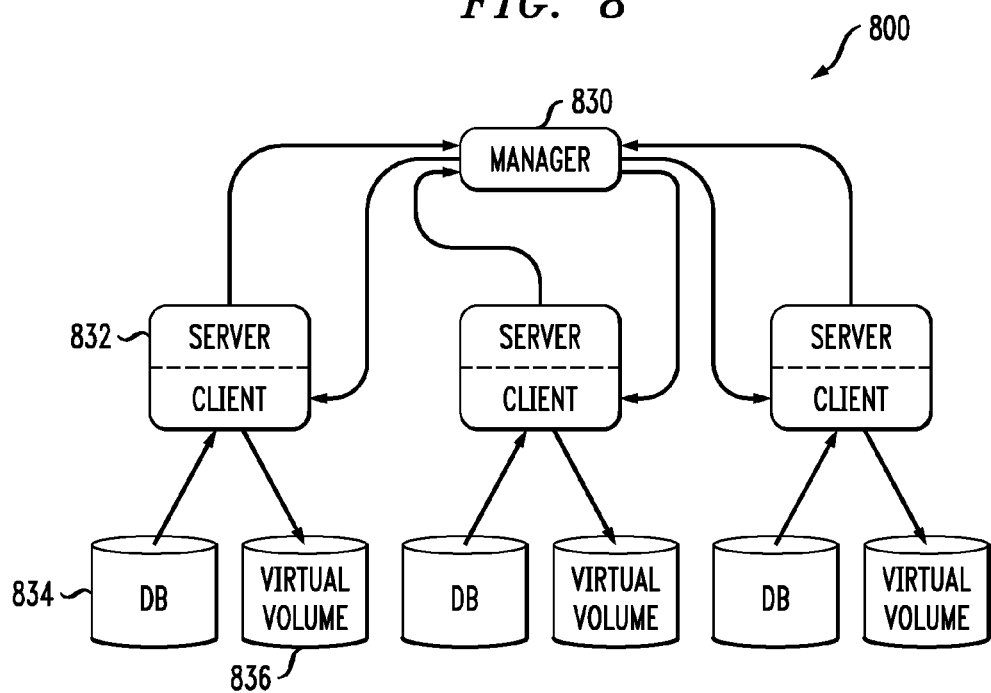

Turning now to FIG. 8, another information processing system 800 comprises a manager 830 that interacts with server and client entities of each of a plurality of containerized storage nodes 832, which may be implemented using ScaleIO™ functionality. For each containerized storage node 832, one or more physical block storage devices 834 are shared via the storage node 832 to the manager 830, which in turn creates one or more virtual storage volumes 836 out of the physical block storage devices 834. The virtual storage volumes are then mapped back to the storage nodes and appear as block storage devices.

Again, it is to be appreciated that the particular arrangements of layers, storage servers, nodes and other components of the systems 600, 700 and 800 and other information processing systems described herein are illustrative only, and should not be construed as limiting in any way. Numerous alternative arrangements of layers, storage servers, nodes, virtual storage volumes and other components can be used in other embodiments. For example, references herein to Cassandra and ScaleIO™ are illustrative only, and alternative database nodes or software-defined storage technologies can be used.

Moreover, embodiments of the invention are not limited to database nodes, and can additionally or alternatively be applied to other types of data fabric layers comprising other types of nodes. Accordingly, the term "data fabric layer" as used herein is intended to be broadly construed.

At least portions of a given one of the systems of FIGS. 1 and 3-8 are implemented using one or more processing platforms, examples of which will be described in greater detail below in conjunction with FIGS. 9 and 10. A given such processing platform comprises at least one processing device comprising a processor coupled to a memory, and the processing device may be implemented at least in part utilizing one or more virtual machines, containers or other virtualization infrastructure.

Figure 9:
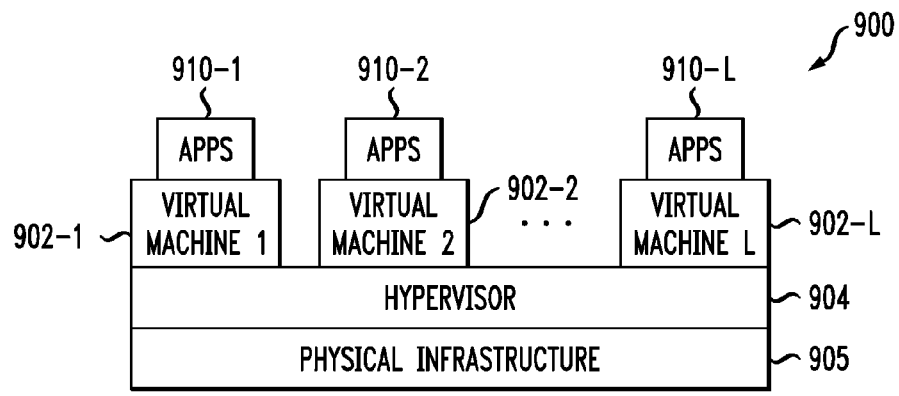
FIGS. 9 and 10 show examples of processing platforms that may be utilized to implement at least a portion of at least one of the information processing systems of FIGS. 1 and 3-8.

As shown in FIG. 9, portions of the information processing systems may comprise cloud infrastructure 900. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, a given information processing system may of course include multiple hypervisors each providing a set of virtual machines using at least one underlying physical machine. Different sets of virtual machines provided by one or more hypervisors may be utilized in configuring multiple instances of local or central nodes or other components of the system.

An example of a commercially available hypervisor platform that may be used to implement hypervisor 904 and possibly other portions of the given information processing system in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the given information processing system.

The cloud infrastructure 900 in FIG. 9 can additionally or alternatively be implemented using other types of virtualization techniques, such as the Docker containers or other types of containers referred to elsewhere herein.

Figure 10:
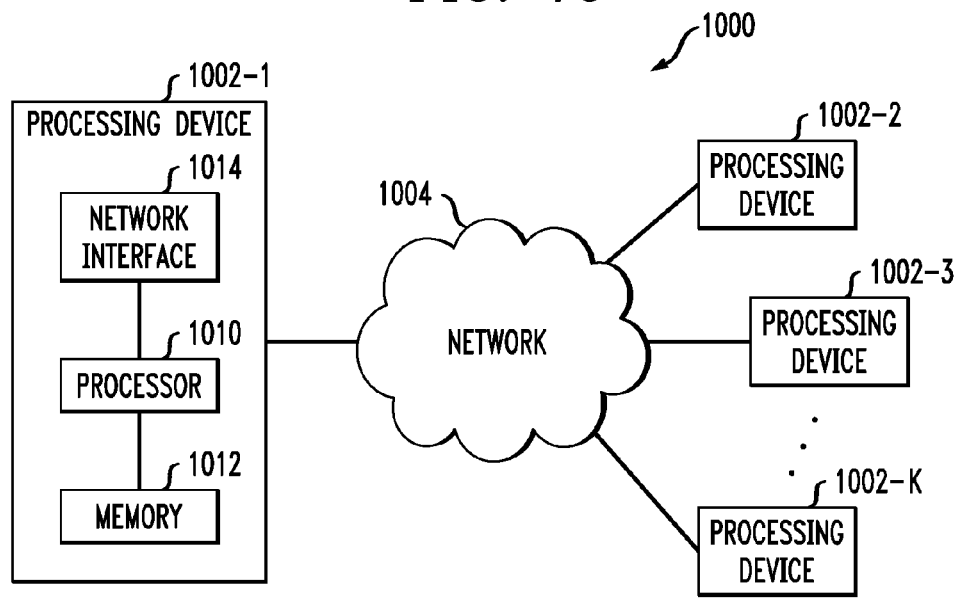

Another example of a processing platform suitable for use in some embodiments is processing platform 1000 shown in FIG. 10. The processing platform 1000 is assumed to comprise at least a portion of an information processing system and includes a plurality of processing devices, denoted 1002-1, 1002-2, 1002-3, . . . 1002-K, which communicate with one another over a network 1004.

As indicated previously, at least parts of these or other networks utilized in embodiments of the invention may comprise, for example, a global computer network such as the Internet, a WAN, or a LAN, as well as various portions or combinations of these and other types of communication networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. Such memory can also include other types of storage devices, such as storage disks or storage arrays. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

One or more of the processing modules or other components of a given information processing system as disclosed herein may each run on a computer, server, storage device or other processing platform element. A given such element may be viewed as an example of what is more generally referred to herein as a "processing device."

Again, the particular processing platform 1000 shown in the figure is presented by way of example only, and an information processing system may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in a given information processing system. Such components can communicate with other elements of the information processing system over any type of network or other communication media.

As indicated previously, components of an associated information processing system as disclosed herein can be implemented at least in part in the form of one or more software programs stored in memory and executed by a processor of a processing device such as one of the virtual machines 902 or one of the processing devices 1002. For example, at least portions of one or more of the database nodes of a data fabric layer in one or more of the embodiments described herein are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems and processing devices. Also, the particular configurations of system and device elements shown in FIGS. 1 and 3-10 can be varied in other embodiments. Thus, for example, the particular types and arrangements of layers, storage servers, nodes, virtual storage volumes or other components deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising:
   a data fabric layer comprising at least one database application; and
   a storage infrastructure layer underlying the data fabric layer and comprising a plurality of storage servers;
   wherein the database application comprises a plurality of nodes associated with respective containers;
   wherein the storage infrastructure layer implements one or more virtual storage volumes for each of the nodes of the database application of the data fabric layer using the plurality of storage servers;
   wherein responsive to detection of a failure of a given one of the nodes of the database application, the one or more virtual storage volumes associated with the given node are utilized to facilitate instantiation of a replacement node for the given node;
   wherein responsive to the detected failure, a new container is started for the replacement node and pointed to the one or more virtual storage volumes associated with the given node;
   wherein in conjunction with facilitating instantiation of the replacement node, the one or more virtual storage volumes are unmounted from the given node and are attached to the replacement node; and
   wherein the processing platform is implemented using at least one processing device comprising a processor coupled to a memory.

2. The apparatus of claim 1 wherein the storage infrastructure layer implements a plurality of single virtual storage volumes for respective ones of the nodes of the database application.

3. The apparatus of claim 1 wherein the data fabric layer is implemented at least in part utilizing virtualization infrastructure of the processing platform.

4. The apparatus of claim 3 wherein the virtualization infrastructure comprises network functions virtualization infrastructure and at least a subset of the nodes of the database application of the data fabric layer are implemented at least in part utilizing one or more virtual network functions of the network functions virtualization infrastructure.

5. The apparatus of claim 1 wherein the storage infrastructure layer is configured to combine storage resources of the plurality of storage servers into a pool of block storage shared by the nodes of the database application.

6. The apparatus of claim 5 wherein the virtual storage volumes are allocated respective portions of the pool of block storage.

7. The apparatus of claim 1 wherein at least a portion of the data stored for one of the nodes of the database application is replicated on another one of the nodes of the database application.

8. The apparatus of claim 1 wherein the nodes of the database application are arranged in a specified logical topology in a first data center.

9. The apparatus of claim 8 wherein the nodes arranged in the specified logical topology in the first data center are part of a cluster of database application nodes that further includes a plurality of additional nodes arranged in at least one additional specified logical topology in at least one additional data center.

10. The apparatus of claim 1 wherein a differential recovery sequence is initiated for the new container using the one or more virtual storage volumes associated with the given node and once completed the replacement node is brought online to replace the given node.

11. An information processing system comprising the apparatus of claim 1.

12. The apparatus of claim 1 wherein the plurality of nodes of the database application comprises a plurality of distributed Cassandra nodes.

13. A method comprising:
    configuring a data fabric layer to include at least one database application having a plurality of nodes associated with respective containers;
    providing a storage infrastructure layer underlying the data fabric layer and comprising a plurality of storage servers; and
    implementing one or more virtual storage volumes for each of the nodes of the database application of the data fabric layer using the plurality of storage servers of the storage infrastructure layer;
    wherein the configuring, providing and implementing are performed by at least one processing device comprising a processor coupled to a memory;
    wherein the method further comprises:
    detecting a failure of a given one of the nodes of the database application; and
    responsive to the detected failure, utilizing the one or more virtual storage volumes associated with the given node to facilitate instantiation of a replacement node for the given node;
    wherein responsive to the detected failure, a new container is started for the replacement node and pointed to the one or more virtual storage volumes associated with the given node; and
    wherein in conjunction with facilitating instantiation of the replacement node, the one or more virtual storage volumes are unmounted from the given node and are attached to the replacement node.

14. The method of claim 13 wherein a differential recovery sequence is initiated for the new container using the one or more virtual storage volumes associated with the given node and once completed the replacement node is brought online to replace the given node.

15. The method of claim 13 wherein the data fabric layer is implemented at least in part utilizing virtualization infrastructure of a processing platform, the virtualization infrastructure comprising network functions virtualization infrastructure, and wherein at least a subset of the nodes of the database application of the data fabric layer are implemented at least in part utilizing one or more virtual network functions of the network functions virtualization infrastructure.

16. The method of claim 13 wherein the storage infrastructure layer is configured to combine storage resources of the plurality of storage servers into a pool of block storage shared by the nodes of the database application and wherein the one or more virtual storage volumes are allocated respective portions of the pool of block storage.

17. The method of claim 13 wherein at least a portion of the data stored for one of the nodes of the database application is replicated on another one of the nodes of the database application.

18. The method of claim 13 wherein the nodes of the database application are arranged in a specified logical topology in a first data center.

19. A non-transitory processor-readable storage medium having stored therein program code of one or more software programs, wherein the program code when executed by at least one processing device causes said processing device:
to configure a data fabric layer to include at least one database application having a plurality of nodes associated with respective containers;
to provide a storage infrastructure layer underlying the data fabric layer and comprising a plurality of storage servers; and
to implement one or more virtual storage volumes for each of the nodes of the database application of the data fabric layer using the plurality of storage servers of the storage infrastructure layer;
wherein the program code when executed further causes said processing device:
to detect a failure of a given one of the nodes of the database application; and
responsive to the detected failure, to utilize the one or more virtual storage volumes associated with the given node to facilitate instantiation of a replacement node for the given node;
wherein responsive to the detected failure, a new container is started for the replacement node and pointed to the one or more virtual storage volumes associated with the given node; and
wherein in conjunction with facilitating instantiation of the replacement node, the one or more virtual storage volumes are unmounted from the given node and are attached to the replacement node.

20. The processor-readable storage medium of claim 19 wherein the storage medium comprises at least one of an electronic memory and a storage disk.

21. The processor-readable storage medium of claim 19 wherein a differential recovery sequence is initiated for the new container using the one or more virtual storage volumes associated with the given node and once completed the replacement node is brought online to replace the given node.

* * * * *